(12) United States Patent
Schwartz

(10) Patent No.: US 10,602,720 B1
(45) Date of Patent: Mar. 31, 2020

(54) LEASH PROTECTOR/DOG TOY METHOD

(71) Applicant: Ilene R. Schwartz, Brandon, FL (US)

(72) Inventor: Ilene R. Schwartz, Brandon, FL (US)

( * ) Notice: Subject to any disclaimer, the term of this patent is extended or adjusted under 35 U.S.C. 154(b) by 0 days.

(21) Appl. No.: 16/027,071

(22) Filed: Jul. 3, 2018

Related U.S. Application Data

(63) Continuation-in-part of application No. 14/808,712, filed on Jul. 24, 2015, now abandoned.

(51) Int. Cl.
*A01K 27/00* (2006.01)
*A01K 15/02* (2006.01)

(52) U.S. Cl.
CPC .......... *A01K 15/026* (2013.01); *A01K 27/003* (2013.01)

(58) Field of Classification Search
CPC ... A01K 15/025; A01K 15/026; A01K 27/003
USPC ................ 119/702, 707–709, 792, 793, 795
See application file for complete search history.

(56) References Cited

U.S. PATENT DOCUMENTS

| 5,474,033 | A | * | 12/1995 | Mitchell, Jr. | ........ | A01K 15/026 |
| | | | | | | 119/709 |
| 5,595,142 | A | * | 1/1997 | Chill | .................... | A01K 5/0114 |
| | | | | | | 119/710 |
| 6,006,699 | A | * | 12/1999 | Keever | ................. | A01K 27/005 |
| | | | | | | 119/795 |
| 6,082,308 | A | * | 7/2000 | Walter | .................. | A01K 27/003 |
| | | | | | | 119/769 |
| 7,506,614 | B1 | * | 3/2009 | Tsengas | ............... | A01K 15/026 |
| | | | | | | 119/709 |
| 9,084,412 | B1 | * | 7/2015 | Dahl | .................... | A01K 27/008 |
| 9,807,980 | B2 | * | 11/2017 | Arnold | ................. | A01K 27/003 |
| 9,844,207 | B1 | * | 12/2017 | Wright | ................ | A01K 13/001 |
| 10,231,438 | B2 | * | 3/2019 | Arnold | ................. | A01K 27/003 |
| 2006/0027189 | A1 | * | 2/2006 | Luber | .................. | A01K 27/003 |
| | | | | | | 119/795 |
| 2006/0230712 | A1 | * | 10/2006 | Spinney | ................. | A01K 13/00 |
| | | | | | | 54/24 |
| 2010/0126430 | A1 | * | 5/2010 | Munroe | ................... | A01K 1/04 |
| | | | | | | 119/795 |
| 2016/0007572 | A1 | * | 1/2016 | Aked-Hurditch | .... | A01K 27/005 |
| | | | | | | 119/707 |

FOREIGN PATENT DOCUMENTS

EP   2255617 A2 * 12/2010   ........... A01K 15/025

* cited by examiner

*Primary Examiner* — David J Parsley
*Assistant Examiner* — Danielle A Clerkley

(57) ABSTRACT

A toy is formed in a hollow configuration with an exterior diameter, an interior diameter, a wall thickness, and a length. The toy is fabricated of a rigid material. The toy has an exterior surface to be held by a dog. The toy is slidably receivable on a leash adjacent to a collar when the dog is being walked. The method includes the step of positioning the toy on the leash closer to the lower end than to the upper end of the leash while the dog is being walked. The toy is removable from the leash to be used as a chew and throw toy separate from the leash.

1 Claim, 2 Drawing Sheets

LEASH PROTECTOR/DOG TOY METHOD

RELATED APPLICATIONS

This application is a continuation-in-part of U.S. patent application Ser. No. 14/808,712, filed Jul. 24, 2015, the subject matter of which is incorporated herein by reference and the priority of which is hereby claimed.

BACKGROUND OF THE INVENTION

Field of the Invention

The present invention relates to a leash protector/dog toy method and more particularly pertains to providing a toy for a dog which will protect a leash from the dog chewing and pulling the leash while the dog is being walked and which is removable from the leash for entertaining the dog in a safe, convenient, and economical manner.

Description of the Prior Art

The use of dog leashes and toys of known designs and configurations is known in the prior art. More specifically, dog leashes and toys of known designs and configurations previously devised and utilized for the purpose of controlling and entertaining a dog are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, the aforementioned patents do not describe a leash protector/dog toy method that allows the providing of a toy for a dog which will protect a leash from the dog chewing and pulling the leash while the dog is being walked and which is removable from the leash for entertaining the dog in a safe, convenient, and economical manner.

Furthermore, it is known that when a dog is fastened to the lower end of a leash and when the dog begins to chew and pull on the leash, it can become difficult for a person to maintain control of the dog and can often times lead to injuries trying to hold onto the leash. The present invention is a device positioned at the lower end of a leash which overcomes this problem, unlike the device of Luber, U.S. patent application Ser. No. 11/187,922, which locates the device at the top end of the leash for being held by a person.

In this respect, the leash protector/dog toy method according to the present invention substantially departs from the conventional concepts and designs of the prior art, and in doing so provides an apparatus primarily developed for the purpose of providing a toy for a dog which will protect a leash from the dog chewing and pulling the leash while the dog is being walked and which is removable from the leash for entertaining the dog in a safe, convenient, and economical manner.

Therefore, it can be appreciated that there exists a continuing need for a new and improved leash protector/dog toy method which can be used for providing a toy for a dog which will protect a leash from the dog chewing and pulling the leash while the dog is being walked and which is removable from the leash for entertaining the dog in a safe, convenient, and economical manner. In this regard, the present invention substantially fulfills this need.

SUMMARY OF THE INVENTION

In view of the disadvantages inherent in the known types of dog leashes and toys of known designs and configurations now present in the prior art, the present invention provides an improved leash protector/dog toy method. As such, the general purpose of the present invention, which will be described subsequently in greater detail, is to provide a new and improved leash protector/dog toy method which has all the advantages of the prior art and none of the disadvantages.

To attain this, the present invention essentially comprises in this broad context, a toy formed in a hollow configuration. The toy has an exterior diameter, an interior diameter, a wall thickness, and a length. The toy is fabricated of a rigid material. The toy has an exterior surface to be held by a dog. The toy is slidably received on a leash adjacent to a collar when the dog is being walked. The toy is slidably positioned on the leash closer to the lower end than to the upper end of the leash while the dog is being. The toy is removable from the leash to provide a toy for the dog separate from the leash.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved leash protector/dog toy method which has all of the advantages of the prior art dog toys and leash protectors of known designs and configurations and none of the disadvantages.

It is another object of the present invention to provide a new and improved leash protector/dog toy method which may be easily and efficiently manufactured and marketed.

It is further object of the present invention to provide a new and improved leash protector/dog toy method which is of durable and reliable constructions.

An even further object of the present invention is to provide a new and improved leash protector/dog toy method which is susceptible of a low cost of manufacture with regard to both materials and labor, and which accordingly is then susceptible of low prices of sale to the consuming public, thereby making such leash protector/dog toy system economically available to the buying public.

Even still another object of the present invention is to provide a leash protector/dog toy method for providing a toy for a dog which will protect a leash from the dog chewing and pulling the leash while the dog is being walked and which is removable from the leash for entertaining the dog in a safe, convenient, and economical manner.

Lastly, it is an object of the present invention to provide a new and improved leash protector/dog toy method for providing a toy for a dog which will protect a leash from the dog chewing and pulling the leash while the dog is being walked and which is removable from the leash for entertaining the dog in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
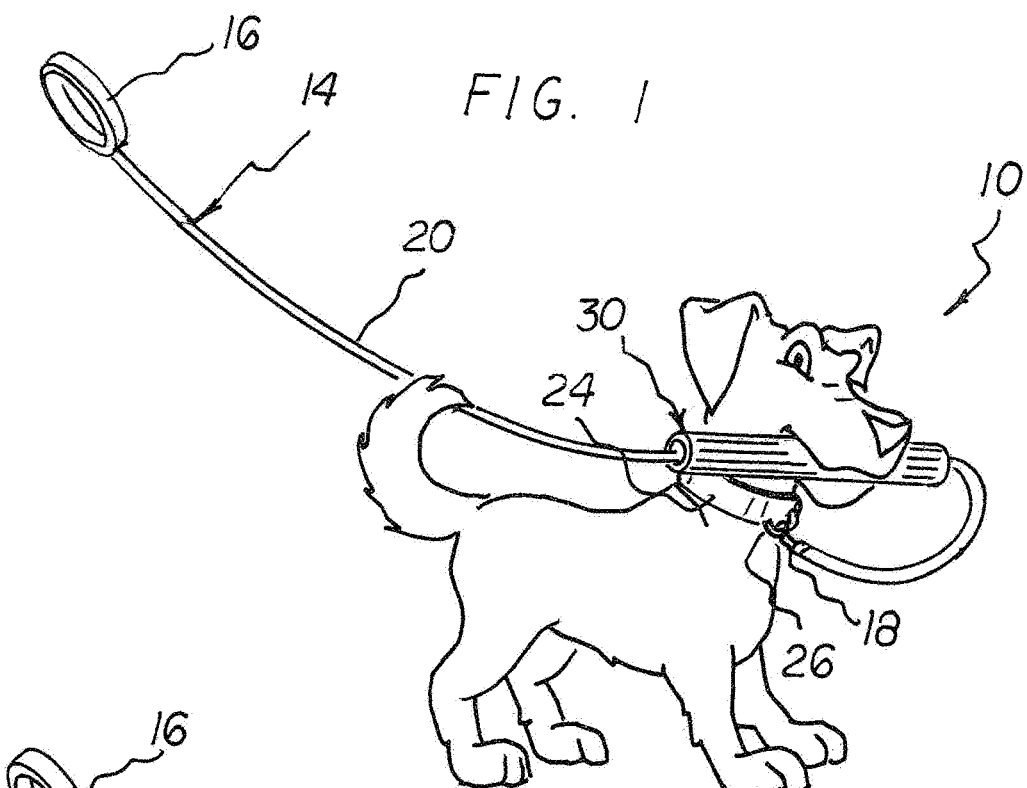
FIG. 1 is a perspective illustration of a leash protector/dog toy system with the system being used primarily as a toy.
Figure 2:
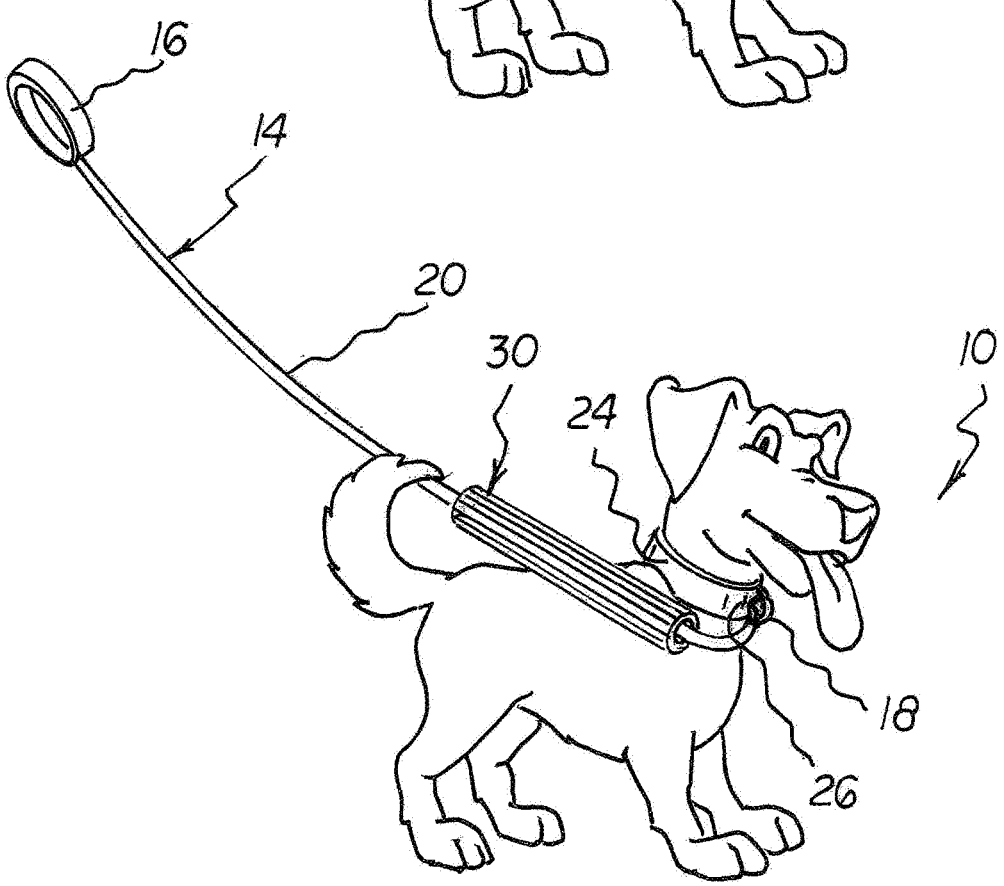
FIG. 2 is a perspective illustration of the leash protector/dog toy system with the system being used primarily as a leash.
Figure 3:
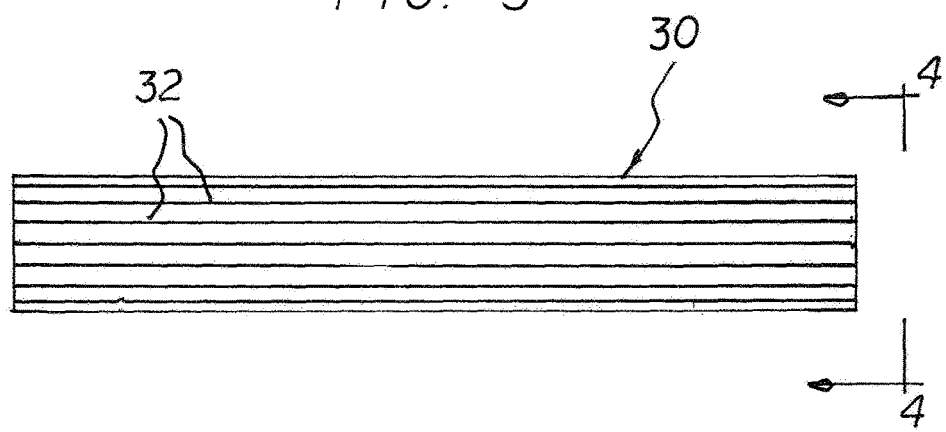
FIG. 3 is a front elevational view of the dog toy shown in the prior Figures.
Figure 4:
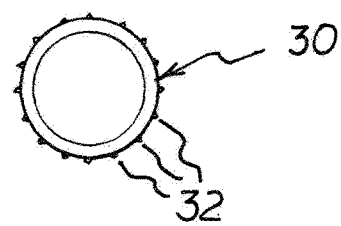
FIG. 4 is an end elevational view taken along line 4-4 of FIG. 3.

With reference now to the drawings, and in particular to FIG. 1 thereof, the preferred embodiment of the new and improved leash protector/dog toy method embodying the principles and concepts of the present invention and generally designated by the reference numeral 10 will be described.

The present invention, the leash protector/dog toy method 10 is comprised of a plurality of components. Such components are individually configured and correlated with respect to each other so as to attain the desired objective. In their broadest context such include a toy and a leash.

In the preferred embodiment of the leash protector/dog toy method, designated by reference numeral 10, first provided is a leash 14 having an upper end and a lower end. A handle 16 is formed in the upper end of the leash. A clip 18 is secured to the lower end of the leash. The leash has a central extent 20 between the handle and the clip. The central extent is fabricated of a flexible inextensible material and has a length of at least four feet.

Next provided is a collar 24. The collar is positioned around the neck of the dog while the dog is being walked. The collar has a ring 26 removably received by the clip. The collar is fabricated of a flexible inextensible material.

A toy 30 is next provided. The toy is formed in a hollow cylindrical configuration. The toy has an exterior diameter of 1.75 inches, plus or minus 25 percent. The toy has an interior diameter of 1.25 inches, plus or minus 25 percent. The toy has a wall thickness of 0.50 inches, plus or minus 25 percent. The toy has a length of 11.00 inches, plus or minus 25 percent. The toy has an exterior surface with projections 32 along the length thereof to facilitate holding by the dog. The toy is fabricated of a chewable material. The toy is slidably received on the leash adjacent to the collar when the dog is being walked. The toy is slidably received on the leash spaced from the collar when held by the dog while the dog is being walked. The toy is removable from the leash for providing entertainment for the dog separate from the leash. The term chewable is meant to include any material which may be chewed by a dog while not being consumer or destroyed. Examples include plastic and rubber, natural and synthetic, and blends thereof. Also included are wood and other materials which may slide on the leash and which do not grip the leash.

Figure 5:
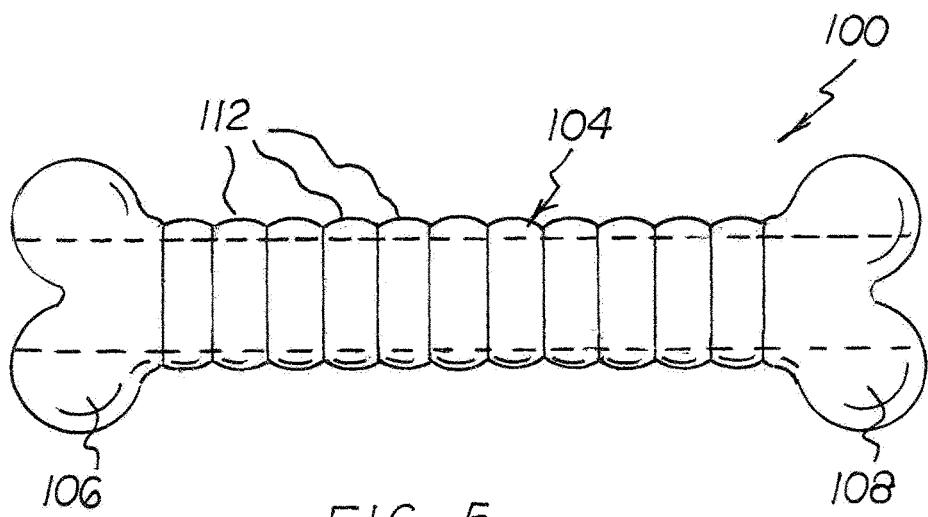
FIG. 5 is a front elevational view of a leash protector/dog toy system constructed in accordance with the principles of the present invention.

An alternate embodiment of the leash protector/dog toy system 100 is shown in FIG. 5. In this embodiment, the exterior surface of the toy is in the shape of a bone. The toy has a central extent 104 in a right circular cylindrical configuration. The toy has an enlarged first end 106 and an axially spaced enlarged second end 108. It should be understood that the shape, size, design, and coloration of the dog toy may vary.

From the above descriptions, it may be noted that the present invention has several beneficial features. For example, if the dog drops the toy while being walked, there will be no need to look for or pick up the toy since it will remain at the bottom of the leash. In addition, the toy may be intentionally separated from the leash to use as a throw toy so that the dog may play with it, chew it, and retrieve it without the leash. The toy will be available in different sizes and can slide over any leash. Its easy removal from the leash allows it to be used as a throw toy also and then slid over the leash when the dog walker is ready to resume walking the dog. It will slide easily on the leash so that the dog cannot pull the leash and play tug-of-war or try to talk the dog walker. Once the dog grabs the toy, the leash can still control the dog, but the toy can be in the dog's mouth also.

In addition to the foregoing system, the present invention is also related to the method of using such system. More specifically, included is a leash protector/dog toy method for providing a toy for a dog which will protect a leash from the dog chewing and pulling the leash while the dog is being walked and which is removable from the leash for entertaining the dog.

The method further includes the step of providing a leash 14 having an upper end and a lower end, a handle 16 formed in the upper end, and a clip 18 secured to the lower end. The leash has a central extent 20 between the handle and the clip. The central extent is fabricated of a flexible inextensible material. The central extent has a length of at least four feet.

Next is the step of providing a collar 24 positioned around a neck of the dog while being walked. The collar has a ring 26 removably received by the clip. The collar is fabricated of a flexible inextensible material.

The next step is providing a toy 30 formed in a hollow cylindrical configuration. The toy has an exterior diameter of 1.75 inches, plus or minus 25 percent. The toy has an interior diameter of 1.25 inches, plus or minus 25 percent. The toy has a maximum wall thickness of 0.50 inches, plus or minus 25 percent. The toy has a length of 11.00 inches, plus or minus 25 percent. The toy has an exterior surface with projections 32 and recesses along the length thereof to facilitate holding by the dog. In one embodiment the projections and recesses are linear. In another embodiment the projections and recesses are circular. In one embodiment the exterior surface is of a generally cross sectional configuration along its entire length. In another embodiment the exterior surface has enlarged ends. The toy is fabricated of a chewable material in a one piece construction. The toy is slidably received on the leash adjacent to the collar when the dog is being walked. The toy is slidably received on the leash.

The last step is positioning the toy closer to the lower end than to the upper end of the leash while the dog is being walked. The toy is adapted to be chewed by the dog while the handle is being held.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A leash protector/dog toy method for providing a toy for a dog which will protect a leash from the dog chewing and pulling the leash while the dog is being walked and which is removable from the leash for entertaining the dog, the method consisting of the steps of:

provinding a leash (14) having an upper end and a lower end, a handle (16) formed in the upper end, a clip (18) secured to the lower end, the leash having a central extent (20) between the handle and the clip, the central extent being fabricated of a flexible inextensible material, the central extent having a length of at least four feet;

providing a collar (24) positioned around a neck of the dog while being walked, the collar having a ring (26) removably received by the clip, the collar being fabricated of a flexible inextensible material;

providing a toy (30) formed in a hollow cylindrical configuration, the toy having an exterior diameter of 1.75 inches, the toy having an interior surface with a diameter of 1.25 inches, the toy having a maximum wall thickness of 0.50 inches, the toy having a length of 11.00 inches, the toy having an exterior surface with linear projections (32) and linear recesses along the entire length thereof to facilitate holding by the dog, the interior surface being circular and with a same cross sectional shape along its entire length, the toy being fabricated of a chewable material in a one piece construction, the toy being slidably received around the leash adjacent to the collar when the dog is being walked;

positioning the toy closer to the lower end than to the upper end of the leash while the dog is being walked, the toy being chewed by the dog while the toy is on the leash and the handle is being held;

removing the toy from the leash; and chewing of the toy by the dog remote from the leash.

\* \* \* \* \*